United States Patent [19]

Schwager et al.

[11] Patent Number: 5,218,047

[45] Date of Patent: Jun. 8, 1993

[54] POLYMER BLENDS OF PROPYLENE COPOLYMERS AND POLYETHYLENE

[75] Inventors: Harald Schwager, Speyer; Klaus-Dieter Ruempler, Wachenheim; Hans-Georg Braun, Gruenstadt, all of Fed. Rep. of Germany

[73] Assignee: BASF Aktiengesellschaft, Ludwigshafen, Fed. Rep. of Germany

[21] Appl. No.: 713,897

[22] Filed: Jun. 12, 1991

[51] Int. Cl.[5] .................. C08L 53/00; C08L 23/06
[52] U.S. Cl. ............................. 525/88; 525/95
[58] Field of Search ............................. 525/88

[56] References Cited

U.S. PATENT DOCUMENTS

| 3,358,053 | 12/1967 | Hostetler | 525/88 |
|---|---|---|---|
| 3,632,674 | 1/1972 | Aishima et al. | 525/88 |
| 3,647,922 | 3/1972 | Leugering et al. | 525/88 |
| 3,751,521 | 8/1973 | Roger | 525/88 |
| 3,917,746 | 11/1975 | Aishima et al. | 525/88 |
| 4,454,299 | 6/1984 | Schweier et al. | 525/53 |
| 4,455,405 | 6/1984 | Jaggard et al. | 525/53 |
| 4,588,775 | 5/1986 | McCullough | 525/88 |

FOREIGN PATENT DOCUMENTS

| 0462448 | 6/1991 | European Pat. Off. . |
|---|---|---|
| 55-104333 | 8/1980 | Japan . |
| 843561 | 5/1984 | South Africa . |
| 843563 | 5/1984 | South Africa . |
| 845261 | 5/1984 | South Africa . |
| 1032945 | 6/1966 | United Kingdom . |

Primary Examiner—Carman J. Seccuro, Jr.
Attorney, Agent, or Firm—Keil & Weinkauf

[57] ABSTRACT

Polymer blends contain a) from 20 to 70% by weight of a propylene copolymer which in turn consists of from 20 to 65% by weight of a propylene homopolymer and 30 to 85% by weight of a random propylene copolymer containing polymerized $C_2$–$C_{10}$-alk-1-enes and b) from 30 to 80% by weight of a polyethylene having a density of from 0.94 to 0.98 g/cm$^3$ and a melt flow index of less than 15 g/10 min at 190° C. under a weight of 2.16 kg.

The novel polymer blends possess, inter alia, high rigidity, high impact strength and little tendency to undergo white fracture and are particularly suitable for the production of films and moldings.

7 Claims, No Drawings

POLYMER BLENDS OF PROPYLENE COPOLYMERS AND POLYETHYLENE

The present invention relates to polymer blends containing a) from 20 to 70% by weight of a propylene copolymer which in turn consists of from 20 to 65% by weight of a propylene homopolymer and 30 to 85% by weight of a random propylene copolymer containing polymerized $C_2$–$C_{10}$-alk-1-enes and b) from 30 to 80% by weight of a polyethylene having a density of from 0.94 to 0.98 g/cm$^3$ and a melt flow index of less than 15 g/10 min at 190° C. under a weight of 2.16 kg.

The present invention furthermore relates to a process for the preparation of these polymer blends and films and moldings of these polymer blends.

The properties of polymers can be changed by admixing other polymers, polymer blends being formed. For example, the properties of rigid, heat-resistant polymers can be combined with those of flexible, resilient polymers by mixing, so that the blends obtainable have an advantageous combination of the good properties of both polymers (Saechtling, Kunststoff-Taschenbuch, Carl Hanser-Verlag, Munich, page 8[1986]). Ethylene/propylene copolymers having polyethylene domains which melt below the processing temperature, in an amorphous polypropylene matrix, are of particular interest in this context (Saechtling, Kunststoff-Taschenbuch, Carl Hanser-Verlag, Munich, page 235 [1986]). By mixing a plurality of polyolefins, it is possible to prepare products which in some cases have contradictory properties, for example high impact strength coupled with high rigidity.

Blends of high-density polyethylene (HDPE) on the one hand and ethylene/propylene/diene copolymers on the other hand, which have high mechanical stability (Polymer Bulletin, 21 (1989) 401–408), are also known. However, they are prepared by relatively expensive processes in the presence of peroxides, which restricts their range of uses.

A combination of different mechanical properties, in particular high impact strength coupled with sufficiently high rigidity, can also be observed in certain propylene/ethylene copolymers. These are obtainable by Ziegler-Natta catalysis (U.S. Pat. Nos. 4 454 299, 4 455 405, ZA-B 0084/3561, ZA-B 0084/3563, ZA-B 0084/5261 and GB-B 1 032 945), gaseous propylene initially being polymerized in a first reaction stage and the resulting homopolymer then being introduced into a second reaction stage, where a mixture of ethylene and propylene is polymerized with said homopolymer. The process is usually carried out at superatmospheric pressure and in the presence of hydrogen as a molecular weight regulator. Although the copolymers obtainable generally have excellent impact strength, they possess poor rigidity as well as a relatively high tendency to undergo white fracture. White fracture is the white coloration of the previously transparent sample in individual areas, which occurs in many plastics during stretching.

It is an object of the present invention to overcome the disadvantages described and to prepare polymers having high impact strength, little tendency to undergo white fracture and high rigidity, without an expensive process.

We have found that this object is achieved by the novel polymer blends defined at the outset and consisting of a propylene copolymer and polyethylene.

The novel polymer blends contain from 20 to 70, preferably from 30 to 70, % by weight of a propylene copolymer which in turn consists of from 20 to 65% by weight of propylene homopolymer and from 35 to 80% by weight of a random propylene copolymer containing polymerized $C_2$–$C_{10}$-alk-1-enes. A preferably used propylene copolymer is one which, in addition to from 35 to 65% by weight of propylene homopolymer, also contains from 35 to 65% by weight of a random propylene copolymer. The random propylene copolymer contains polymerized $C_2$–$C_{10}$-alkenes, for example ethylene, but-1-ene, pent-1-ene, hex-1-ene, hept-1-ene or oct-1-ene or a mixture of these comonomers, ethylene or but-1-ene being preferably used. The amount of comonomer in the random propylene copolymer should not be less than 15, preferably 20, % by weight.

These propylene copolymers are prepared by polymerization with the aid of Ziegler-Natta catalysts, preferably in the gas phase using the polymerization reactors conventionally employed in industry. The Ziegler-Natta catalysts used usually consist of a solid component which contains an electron donor in addition to titanium, magnesium and a halogen, an aluminum component and a further electron donor component.

For the preparation of the titanium-containing solid component, the titanium compounds generally used are halides or alcoholates of trivalent or tetravalent titanium, the chlorides of titanium, in particular titanium tetrachloride, being preferred. The titanium-containing solid component advantageously contains a finely divided carrier, silicas and aluminas and aluminum silicates of the empirical formula $SiO_2 \cdot aAl_2O_3$ where a is from 0.001 to 2, in particular from 0.01 to 0.5, having proven suitable for this purpose.

Preferably used carriers have a particle diameter of from 0.1 to 1,000 μm, in particular from 10 to 300 μm, a pore volume of from 0.1 to 10, in particular from 1.0 to 5.0, cm$^3$/g, and a specific surface area of from 10 to 1,000, in particular from 100 to 500, m$^2$/g.

Compounds of magnesium are also used in the preparation of the titanium-containing solid component. Particularly suitable compounds of this type are magnesium halides, alkylmagnesiums and arylmagnesiums, as well as alkoxymagnesium and aryloxymagnesium compounds, magnesium dichloride, magnesium bromide and di-$C_1$–$C_{10}$-alkylmagnesium compounds preferably being used. The titanium-containing solid component may furthermore contain halogen, preferably chlorine or bromine.

The titanium-containing solid component also contains electron donor compounds, for example mono- or polyfunctional carboxylic acids, anhydrides and esters, as well as ketones, ethers, alcohols, lactones and organophosphorus and organosilicon compounds. Electron donor compounds which are preferably used in the titanium-containing solid component are phthalic acid derivatives of the general formula I

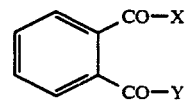

I where X and Y are each chlorine or $C_1$–$C_{10}$-alkoxy or together are oxygen. Particularly preferred electron donor compounds are phthalates where X and Y are each $C_1$–$C_8$-alkoxy, for example methoxy, ethoxy, propoxy or butoxy.

Other preferred electron donor compounds in the titanium-containing solid component include diesters of 3-membered or 4-membered unsubstituted or substituted cycloalkyl-1,2-dicarboxylic acids, and monoesters of unsubstituted or substituted benzophenone-2-carboxylic acids. The alcohols conventionally used in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols, are employed as hydroxy compounds in these esters.

The titanium-containing solid component can be prepared by conventional methods. Examples of these are described in, inter alia, EP-A 45 975, EP-A 45 977, EP-A 86 473, EP-A 171 200, GB-A 2 111 066 and U.S. Pat. No. 4,857,613.

The following three-stage process is preferably used for the preparation of the titanium-containing solid component:

In the first stage, a solution of the magnesium-containing compound in a liquid alkane is initially added to a finely divided carrier, preferably $SiO_2 \cdot aAl_2O_3$ where a is from 0.001 to 2, in particular from 0.01 to 0.5, after which this mixture is stirred for from 0.5 to 5 hours at from 10° to 120° C. From 0.1 to 1 mol of the magnesium compound is preferably used per mol of the carrier. A halogen or hydrogen halide, in particular chlorine or hydrogen chloride, is then added in not less than a twofold, preferably not less than a 5-fold, molar excess, based on the magnesium-containing compound, while stirring constantly. After about 30–120 minutes, the solid is separated off from the liquid phase.

In the second stage, the product obtained in this manner is introduced into a liquid alkane, after which a $C_1$–$C_8$-alkanol, in particular ethanol, a halide or an alcoholate of trivalent or tetravalent titanium, in particular titanium tetrachloride, and an electron donor compound are added. From 1 to 5, in particular from 2 to 4, mol of alkanol, from 2 to 20, in particular from 4 to 10, mol of trivalent or tetravalent titanium and from 0.01 to 1, in particular from 0.1 to 1, mol of the electron donor compound are used per mol of magnesium in the solid obtained from the first stage. This mixture is stirred for not less than one hour at from 10° to 150° C., and the solid substance thus obtained is filtered off and washed with a liquid alkane, preferably with hexane or heptane.

In the third stage, the solid obtained in the second stage is extracted for some hours at from 100° to 150° C. with excess titanium tetrachloride or with excess solution of titanium tetrachloride in an inert solvent, preferably an alkylbenzene, the solvent containing not less than 5% by weight of titanium tetrachloride. The product is then washed with a liquid alkane until the content of titanium tetrachloride in the wash liquid is less than 2% by weight.

The titanium-containing solid component obtainable in this manner is used with cocatalysts as a Ziegler-Natta catalyst system. Suitable cocatalysts are aluminum compounds and electron donor compounds.

Aluminum compounds which are suitable as cocatalysts are trialkylaluminum as well as compounds in which an alkyl group has been replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, anhydrides and esters, as well as ketones, ethers, alcohols, lactones and organophosphorus and organosilicon compounds, are also used as further cocatalysts. Preferred electron donor compounds are organosilicon compounds of the general formula II $$R^1{}_n Si(OR^2)_{4-n} \qquad \text{II}$$

where the radicals $R^1$ are identical or different and are each $C_1$–$C_{20}$-alkyl, 5-membered to 7-membered cycloalkyl which in turn may carry a $C_1$–$C_{10}$-alkyl group, or $C_6$–$C_{20}$-aryl or arylalkyl, the radicals $R^2$ are identical or different and are each $C_1$–$C_{20}$-alkyl and n is 1, 2 or 3. Particularly preferred compounds are those in which $R^1$ is $C_1$–$C_8$-alkyl or 5-membered or 7-membered cycloalkyl, $R^2$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 80:1. The individual catalyst components can be introduced into the polymerization system in any order, individually or as a mixture of two components.

The propylene copolymers required for the preparation of the novel polymer blends can be prepared in a two-stage process in which propylene is polymerized in a first polymerization stage and then, in a second polymerization stage, a mixture of propylene and one or more $C_2$–$C_{10}$-alk-1-enes is polymerized with this polymer.

The polymerization of the propylene is carried out in the first polymerization stage at from 20 to 40 bar and from 60° to 90° C. and with a mean residence time of the reaction mixture of from 1 to 5 hours. Pressures of from 20 to 35 bar, temperatures of from 65° to 85° C. and mean residence times of from 1.5 to 4 hours are preferred. The reaction conditions usually chosen are such that from 0.05 to 2 kg, preferably from 0.1 to 1.5 kg, of polypropylene are formed per mmol of the aluminum component in the first polymerization stage.

After the end of the reaction, this polypropylene is discharged together with the catalyst from the first polymerization stage and introduced into the second polymerization stage, where a mixture of propylene and one or more $C_2$–$C_{10}$-alk-1-enes, in particular ethylene or but-1-ene, is polymerized with it. The pressure prevailing in the second polymerization stage is 7, preferably 10, bar below that in the first polymerization stage and is from 5 to 30, preferably from 10 to 25, bar. The temperature is from 30° to 100° C., preferably from 35° to 80° C., and the mean residence time of the polymer is from 1 to 5, preferably 1.5 to 4, hours.

In the second polymerization stage, the ratio of the partial pressure of propylene to that of the $C_2$–$C_{10}$-alk-1-ene or $C_2$–$C_{10}$-alk-1-enes is usually from 0.5:1 to 5:1, in particular from 1:1 to 4:1. The weight ratio of the monomers converted in the first polymerization stage to those converted in the second polymerization stage is from 0.5:1 to 20:1, in particular from 0.9:1 to 15:1.

It is also possible to add a $C_1$-$C_8$-alkanol, in particular a $C_1$-$C_4$-alkanol to the reaction mixture in the second polymerization stage, said alkanol influencing the activity of the Ziegler-Natta catalyst. Suitable alkanols for this purpose include methanol, ethanol, n-propanol, n-butanol and very particularly isopropanol. The amount of added $C_1$-$C_8$-alkanol is advantageously such that the molar ratio of the aluminum compound to the $C_1$-$C_8$-alkanol is from 0.1:1 to 10:1, in particular from 0.2:1 to 5:1. By suitable choice of the reaction parameters, it should also be ensured that the weight ratio of the monomers converted in the first polymerization stage to those converted in the second polymerization stage is from 0.5:1 to 20:1, in particular from 0.9:1 to 15:1.

The novel polymer blends furthermore contain from 30 to 80, preferably from 30 to 70%, by weight of a polyethylene having a density of from 0.94 to 0.98 g/cm$^3$ and a melt flow index of less than 15 g/10 min at 190° C. under a weight of 2.16 kg (determined according to DIN 53,735). A polyethylene having a density of from 0.945 to 0.970 g/cm$^3$ and a melt flow index of less than 12 g/10 min at 190° C. under a weight of 2.16 kg is preferably used. The melt flow index corresponds to the amount of polymer which is forced out in the course of 10 minutes, at 190° C. under a weight of 2.16 kg, from the test apparatus standardized according to DIN 53,735.

Such polyethylenes are usually prepared by low pressure polymerization using metal-containing catalysts, for example with the aid of titanium-containing and aluminum-containing Ziegler-Natta catalysts, or by means of Phillips catalysts based on chromium-containing compounds. The polymerization reaction can be carried out using the reactors conventionally employed in industry, in the gas phase, in solution or in suspension. The polyethylene can be used as grit and as granules in the preparation of the novel polymer blend.

The polyethylene is admixed with the propylene copolymer in the apparatuses usually employed in plastics processing for combining substances, for example in drum mixers, mills, screw or disk-type extruders, roll mills or kneaders. The mixing process is carried out, for example, in an extruder at from 1 to 50 bar and from 20° to 300° C. and with a mean residence time of from 0.1 to 5 minutes. Pressures of from 10 to 40 bar, temperatures of from 100° to 280° C. and mean residence times of from 0.5 to 3 minutes are preferred.

In another embodiment of the preparation process leading to the novel polymer blends, it is also possible to introduce the polyethylene directly into the reactors used for the preparation of the propylene copolymer, so that the propylene polymerization and the mixing process can take place simultaneously. In this case, it should be ensured that the reactors used for the propylene polymerization are provided with suitable stirring apparatuses.

The novel polymer blends have, inter alia, high impact strength, good rigidity and little tendency to undergo white fracture. They can be produced without expensive processes and are particularly suitable for the production of films, tubes, coverings, fibers, hollow articles and injection molded articles and of moldings for automotive construction.

EXAMPLES

All Examples 1a-1d, 2a-2d and 3a-3f were carried out in a twin-screw extruder from Werner & Pfleiderer (ZSK 30 or ZSK 40) at 30 bar and 220° C. and with a mean residence time of 1 minute. The propylene copolymers and polyethylenes used were introduced into the twin-screw extruder in the form of grit or granules.

Example 1a 70 parts by weight of a propylene copolymer containing 62% by weight of propylene homopolymer and 38% by weight of a propylene/ethylene copolymer [determined by extraction fractionation according to W. Holtrup, Makromol. Chem. 178, 2335 (1977)], having an ethylene content of 20% by weight, based on the propylene copolymer [determined by infrared spectroscopy], and a melt flow index of 1.9 g/10 min [at 230° C. and 2.16 kg according to DIN 53,735], were mixed, in a twin-screw extruder, with 30 parts by weight of a polyethylene having a density of 0.948-0.952 g/cm$^3$ and a melt flow index of 0.2 g/10 min [at 190° C. and 2.16 kg, according to DIN 53,735].

The melt flow index, the rigidity (G modulus), the impact strength, the notched impact strength and the white fracture of the resulting polymer blend were determined. The exact results of the measurements are shown in Table 1 below.

Determination of white fracture

The white fracture was determined with the aid of a falling dart apparatus according to DIN 53,443, Part 1, a falling dart having a mass of 250 g, an impact element of 5 mm diameter and a cap radius of 25 mm. The height of fall was 50 cm.

The test specimen used was an injected molded circular disk having a diameter of 60 mm and a thickness of 2 mm. The test specimen was injected molded at a melt temperature of 250° C. and a mold surface temperature of 30° C.

The test was carried out at 23° C., each test specimen being subjected to only one impact test. The test specimen was first placed on a support ring, without the latter being clamped, and the falling dart was then released. 5 test specimens were tested in each case in order to obtain a mean value.

The diameter of the visible white fracture mark is stated in mm and was determined by measuring it in the direction of flow and at right angles thereto, on that side of the circular disk facing away from the impact, and calculating the mean of the two values.

Examples 1b-1d

The propylene copolymer used was mixed with polyethylene under the conditions of Example 1a. The amounts of polymers used and the densities of the polyethylene used are shown in Table 1 below, together with the properties of the polymer blends obtained in the experiments. The melt flow index of the polyethylene used was 0.2 g/10 min in each case [at 190° C. and 2.16 kg, according to DIN 53,735].

TABLE 1

| | Propylene copolymer used | 1a | 1b | 1c | 1d |
|---|---|---|---|---|---|
| Parts by weight of propylene copolymer | | 70 | 57 | 50 | 34 |
| Parts by weight of polyethylene | | 30 | 43 | 50 | 66 |
| Density of polyethylene [g/cm$^3$] | | 0.948 | 0.948 | 0.948 | 0.948 |
| | | 0.952 | 0.952 | 0.952 | 0.952 |
| Melt flow Index$^a$ of the resulting polymer blend [g/10 min] | | 1.0 | 0.8 | 0.5 | 0.4 |
| Rigidity$^b$ (G modulus) [N/mm$^2$] | 270 | 275 | 360 | 370 | 410 |
| Impact strength$^c$ [kJ/m$^2$] | no fracture | no fracture | no fracture | no fracture | no fracture |
| Notched impact strength$^d$ [kJ/m$^2$] | 43* | 43* | 43* | 43* | 40* |
| White fracture$^e$ [mm] | 6.6 | 0 | 0 | 0 | 0 |

$^a$at 230° C. and 2.16 kg, according to DIN 53,735
$^b$according to DIN 53,445
$^c$according to DIN 53,453, at −20° C.
$^d$according to DIN 53,453, at −20° C.
$^e$at 23° C., description on page 10
*Partial fracture

Example 2a 67 parts by weight of a propylene copolymer containing 47% by weight of propylene homopolymer and 53% by weight of a propylene/ethylene copolymer [determined by extraction fractionation according to W. Holtrup, Makromol. Chem. 178, 2335 (1977)], having an ethylene content of 27% by weight, based on the propylene copolymer [determined by infrared spectroscopy], and a melt flow index of 1.2 g/10 min [at 230° C. and 2.16 kg, according to DIN 53,735], were mixed, in a twin-screw extruder, with 33 parts by weight of a polyethylene having a density of 0.948–0.952 g/cm$^3$ and a melt flow index of 0.2 g/10 min [at 190° C. and 2.16 kg, according to DIN 53,735].

The melt flow index, the rigidity (G modulus), the impact strength, the notched impact strength and the white fracture of the resulting the polymer blend were determined. The exact results of the measurements are shown in Table 2 below.

EXAMPLES 2b–2d

The propylene copolymer used was mixed with polyethylene under the conditions of Example 2a. The amounts of the polymers used and the densities of the particular polyethylene are shown in Table 2 below, together with the properties of the polymer blends obtained in the experiments. The melt flow index of the polyethylene used was 0.2 g/10 min in each case [at 190° C. and 2.16 kg, according to DIN 53,735].

TABLE 2

| | Propylene copolymer used | Examples | | | |
|---|---|---|---|---|---|
| | | 2a | 2b | 2c | 2d |
| Parts by weight of propylene copolymer | | 67 | 62 | 59 | 55 |
| Parts by weight of polyethylene | | 33 | 38 | 41 | 45 |
| Density of polyethylene [g/cm$^3$] | | 0.948 | 0.948 | 0.948 | 0.948 |
| | | 0.952 | 0.952 | 0.952 | 0.952 |
| Melt flow Index$^a$ of the resulting polymer blend [g/10 min] | | 0.7 | 0.7 | 0.6 | 0.6 |
| Rigidity$^b$ (G modulus) [N/mm$^2$] | 185 | 260 | 270 | 275 | 295 |
| Impact strength$^c$ [kJ/m$^2$] | no fracture | no fracture | no fracture | no fracture | no fracture |
| Notched impact strength$^d$ [kJ/m$^2$] | 100%* | 100%* | 100%* | 100%* | 100* |
| White fracture$^e$ | 0 | 0 | 0 | 0 | 0 |

TABLE 2-continued

| Propylene copolymer used | Examples | | | |
|---|---|---|---|---|
| | 2a | 2b | 2c | 2d |
| [mm] | | | | |

[a] at 230° C. and 2.16 kg, according to DIN 53,735
[b] according to DIN 53,445
[c] according to DIN 53,453, at −20° C.
[d] according to DIN 53,453, at −20° C.
[e] at 23° C., description on page 10
*Fractured Example 3a 3d–3f [at 190° C. and 2.16 kg according to DIN 53,735].

TABLE 3

| | Propylene copolymer used | Examples | | | | | |
|---|---|---|---|---|---|---|---|
| | | 3a | 3b | 3c | 3d | 3e | 3f |
| Parts by weight of propylene copolymer | | 70 | 55 | 40 | 70 | 55 | 40 |
| Parts by weight of polyethylene | | 30 | 45 | 60 | 30 | 45 | 60 |
| Density of polyethylene [g/cm³] | | 0.948 – 0.952 | 0.948 – 0.952 | 0.948 – 0.952 | 0.962 – 0.966 | 0.962 – 0.966 | 0.962 – 0.966 |
| Melt flow Index[a] of the resulting polymer blend [g/10 min] | | 4.1 | 1.8 | 1.1 | 9.6 | 9.3 | 9.7 |
| Rigidity[b] (G modulus) [N/mm²] | 260 | 270 | 335 | 385 | 280 | 350 | 400 |
| Impact strength[c] [kJ/m²] | no fracture | no fracture | no fracture | no fracture | no fracture | no fracture | no fracture |
| Notched impact strength[d] [kJ/m²] | 100%* | 100%* | 100%* | 100%* | 100%* | 100%* | 100%* 11.2 |
| White fracture[e] [mm] | 0 | 0 | 0 | 0 | 0 | 0 | 0 |

[a] at 230° C. and 2.16 kg, according to DIN 53,735
[b] according to DIN 53,445
[c] according to DIN 53,453, at −20° C.
[d] according to DIN 53,453, at −20° C.
[e] at 23° C., description on page 10
*Fractured 70 parts by weight of a propylene copolymer containing 62% by weight of propylene homopolymer and 38% by weight of a propylene/ethylene copolymer, having an ethylene content of 20% by weight, based on the propylene copolymer, and a melt flow index of 9.6 g/10 min [at 230° C. and 2.16 kg, according to DIN 53,735], were mixed, in a twin-screw extruder, with 30 parts by weight of a polyethylene having a density of 0.948–0.952 g/cm³ and a melt flow index of 0.2 g/10 min [at 190° C. and 2.16 kg, according to DIN 53,735].

The melt flow index, the rigidity (G modulus), the impact strength, the notched impact strength and the white fracture of the resulting the polymer blend were determined. The exact results of the measurements are shown in Table 3 below.

Examples 3b–3f

The propylene copolymer used was mixed with polyethylene under the conditions of Example 3a. The amounts of polymers used and the densities of the particular polyethylenes employed are shown in Table 3 below, together with the properties of the polymer blends obtained in the experiments. The melt flow index of the polyethylene used was 0.2 g/10 min in each of Examples 3b and 3c and 8.0/10 min in each of Examples The Examples show that the novel polymer blends have high rigidity and in some cases a considerably reduced tendency to undergo white fracture while possessing an unchanged high impact strength.

We claim:
1. A polymer blend containing
   a) from 20 to 70% by weight of a propylene copolymer which in turn consists of from 20 to 65% by weight of a propylene homopolymer and 35 to 80% by weight of a random propylene copolymer containing polymerized $C_2$–$C_{10}$-alk-1-enes which is obtained by a two-stage process in which propylene is polymerized in a first polymerization stage and then, in a second polymerization stage, a mixture of propylene and at least one $C_2$–$C_{10}$-alk-1-ene is polymerized with this polymer and
   b) from 30 to 80% by weight of a polyethylene having a density of from 0.94 to 0.98 g/cm³ and a melt flow index of less than 15 g/10 min at 190° C. under a weight of 2.16 kg.
2. A polymer blend as defined in claim 1, which contains from 30 to 70% by weight of a propylene copolymer and from 30 to 70% by weight of polyethylene.
3. A polymer blend as defined in claim 1, which contains a propylene copolymer which consists of from 35 to 65% by weight of propylene homopolymer and from 35 to 65% by weight of a random propylene copolymer.

4. A polymer blend as defined in claim 1, which contains a polyethylene having a density of from 0.945 to 0.970 g/cm$^3$.

5. A polymer blend as defined in claim 1, which contains a polyethylene having a melt flow index of less than 12 g/10 min at 190° C. and a weight of 2.16 kg.

6. A film or molding of a polymer blend as defined in claim 1.

7. A process for the preparation of an improved polymer blend which comprises: admixing a propylene copolymer as defined in claim 1 with a propylene as defined in claim 1.

* * * * *